United States Patent
Wang (10) Patent No.: US 11,307,214 B2
(45) Date of Patent: Apr. 19, 2022

(54) STRUCTURE OF SPEED SENSOR ARRANGEMENT OF VEHICLE

(71) Applicant: KWANG YANG MOTOR CO., LTD., Kaohsiung (TW)

(72) Inventor: Chun-Kai Wang, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 17/027,656

(22) Filed: Sep. 21, 2020

(65) Prior Publication Data

US 2021/0156880 A1 May 27, 2021

(30) Foreign Application Priority Data

Nov. 27, 2019 (TW) .................................. 108215759

(51) Int. Cl.
*G01P 3/36* (2006.01)
*F16H 57/035* (2012.01)
*F16H 37/02* (2006.01)
*G01P 3/44* (2006.01)

(52) U.S. Cl.
CPC .............. *G01P 3/36* (2013.01); *F16H 37/021* (2013.01); *F16H 57/035* (2013.01); *G01P 3/44* (2013.01)

(58) Field of Classification Search
CPC . G01P 3/36; G01P 3/44; F16H 57/035; F16H 37/021
See application file for complete search history.

(56) References Cited

U.S. PATENT DOCUMENTS

| | | | |
|---|---|---|---|
| 2018/0266522 A1* | 9/2018 | Chung | ...................... F16H 3/74 |
| 2019/0011024 A1* | 1/2019 | Cheng | ................. F16H 61/6648 |
| 2021/0009193 A1* | 1/2021 | Ooba | ..................... B62D 17/00 |

* cited by examiner

*Primary Examiner* — Manuel A Rivera Vargas
(74) *Attorney, Agent, or Firm* — Leong C. Lei (57) ABSTRACT

A structure of a speed sensor arrangement of a vehicle is provided. The vehicle includes a power unit. The power unit is connected with a transmission system. The transmission system is formed with a sensing space. The sensing space is provided therein with a speed sensor. As such, the speed sensor is arranged in a completely concealed space to prevent the speed sensor from being hit by external sand and stones or corroded by external dust or moisture.

16 Claims, 10 Drawing Sheets

STRUCTURE OF SPEED SENSOR ARRANGEMENT OF VEHICLE

TECHNICAL FIELD OF THE INVENTION

The present invention relates to a structure of a speed sensor arrangement of a vehicle, and more particularly to a structure of a speed sensor arrangement of a vehicle that allows a speed sensor to be arranged in a completely concealed space to prevent the speed sensor from being hit by external sand and stones or corroded by external dust or moisture.

DESCRIPTION OF THE PRIOR ART

To allow an operator of a vehicle to get aware of a moving speed of the vehicle, a speed sensor is often provided on the vehicle. The speed sensor transmits a message to a dashboard or instrument device to have the speed of the vehicle displayed thereon.

As disclosed in Taiwan Patent No. 153760, an effect of detection of a moving speed of a vehicle can be achieved, yet the speed sensor is mounted on a wheel axle, and relies only on a covering member to shield in order prevent external dust and moisture from corroding the speed sensor. Since such a covering member provides only a very limited effect of shielding, it is often that the speed sensor gets damaged. Manufacturers provide additional, reinforced leakage-preventing mechanism that is elaborate and complicated to prevent external dust or moisture from corroding the speed sensor. Such elaborate and complicated leakage-preventing engineering inevitably increases the difficulty of disposition and arrangement of the speed sensor.

Thus, it is a challenge to be solved by the vehicle manufacturers to provide a structure of a speed sensor arrangement of a vehicle, which helps simplifies disposition engineering of a speed sensor and ensures operability of the speed sensor.

SUMMARY OF THE INVENTION

The primary objective of the present invention is to provide a structure of a speed sensor arrangement of a vehicle, which is provided to overcome the drawback of the prior art speed sensor arrangement that has insufficient concealment and is thus easily hit by external sand and stones and corroded by external dust and moisture.

For such a purpose, the technical solution of the present invention as proposed in claim 1 is to provide a structure of a speed sensor arrangement of a vehicle, wherein the vehicle includes a power unit, and the power unit is connected with a transmission system, and the transmission system is formed with a sensing space, and the sensing space is provided therein with a speed sensor.

The efficacy that is achieved with the primary technical solution of the present invention as proposed in claim 1 is that the speed sensor is disposed in a completely sealed space and is thus protected the speed sensor from being hit by external sand and stones or being corroded by external dust and moisture.

DETAILED DESCRIPTION OF THE PREFERRED EMBODIMENT

For better understanding of the structure of the present invention and the efficacy that can be achieved thereby, a detail description will be provided below, with reference to the attached drawings.

Figure 1:
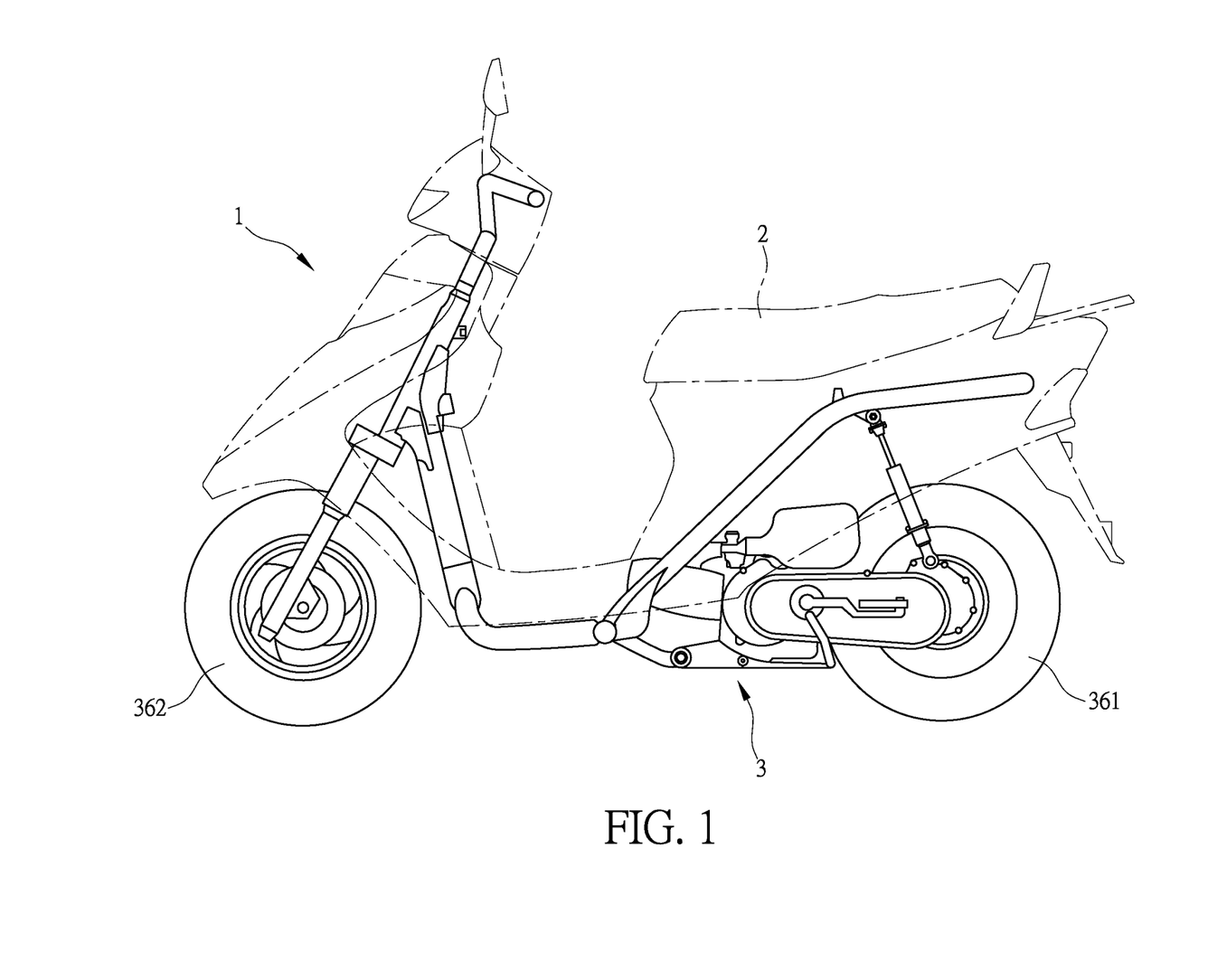
FIG. 1 is a schematic view showing a vehicle according to the present invention.
Figure 2:
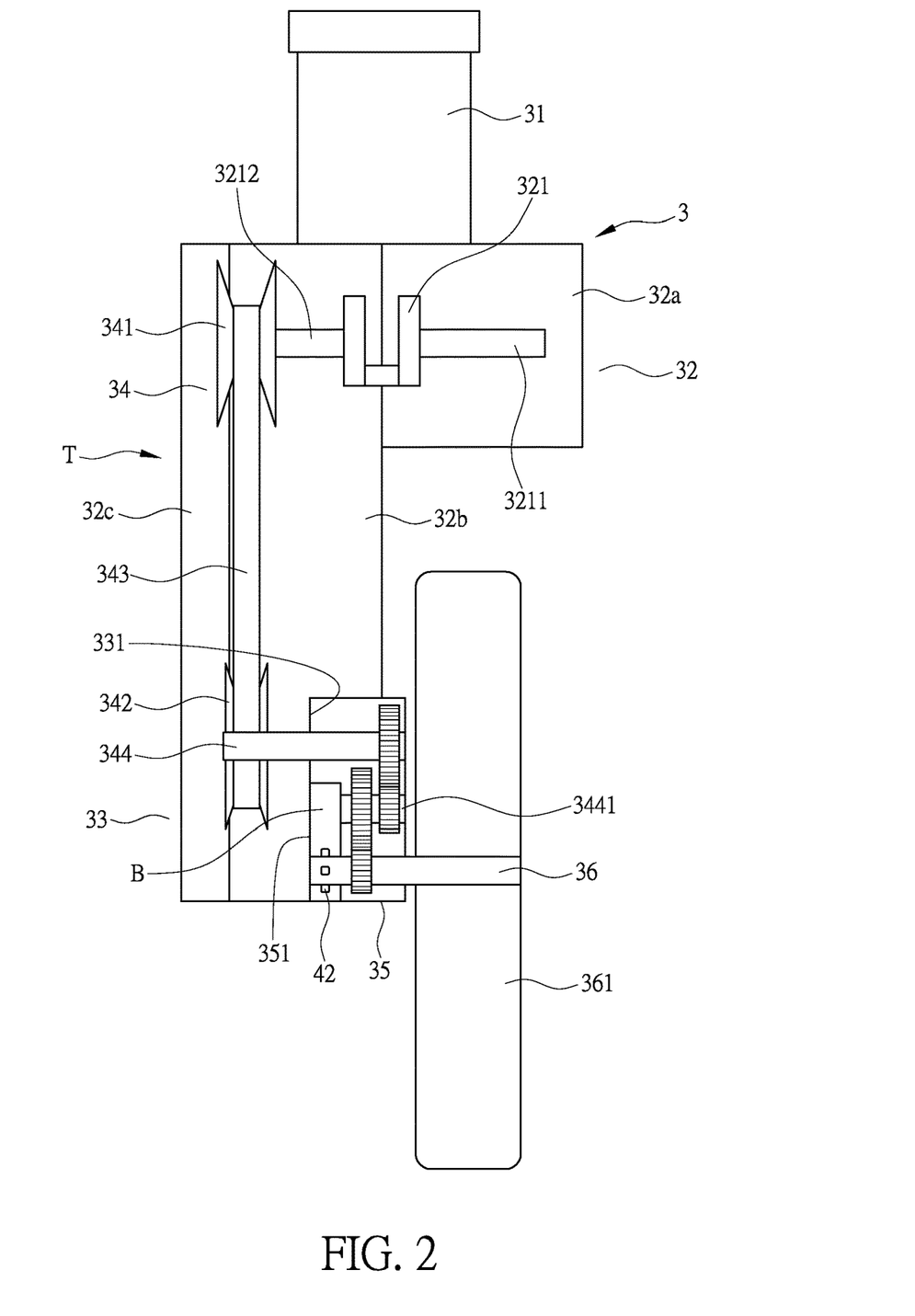
FIG. 2 is a schematic view illustrating an arrangement of a vehicle and a power unit according to the present invention.

Firstly, referring to the illustrations of FIGS. 1 and 2, for a structure of a speed sensor arrangement of a vehicle according to the present invention, a vehicle 1 includes a seat unit 2 and a power unit 3. The power unit 3 is a power unit in the form of an internal combustion engine. The power unit 3 includes a cylinder portion 31. The cylinder portion 31 is connected with a crankcase 32. The crankcase 32 comprises a crankshaft 321 arranged in an interior thereof. The crankshaft 321 is extended toward two sides in a vehicle-body left-right direction to respectively form output shafts 3211, 3212. The crankcase 32 is connected, at one side thereof (which is a left side of the vehicle body), to a transmission system T. The transmission system T includes a continuously variable transmission box 33. The continuously variable transmission box 33 comprises a belt continuously variable transmission mechanism (continuously variable transmission mechanism) 34. The continuously variable transmission box 33 is connected, at one side thereof that is distant from the crankcase 32, to a gear box 35 that comprises a reduction gear set arranged therein. The gear box 35 is operable to drive an output shaft 36. The output shaft 36 is rotatably mounted to and supporting a rear wheel 361. Upon being driven, the rear wheel 361 drives a front wheel 362 that is rotatably mounted to a front side of the vehicle 2 to rotate in synchronization therewith.

Figure 3:
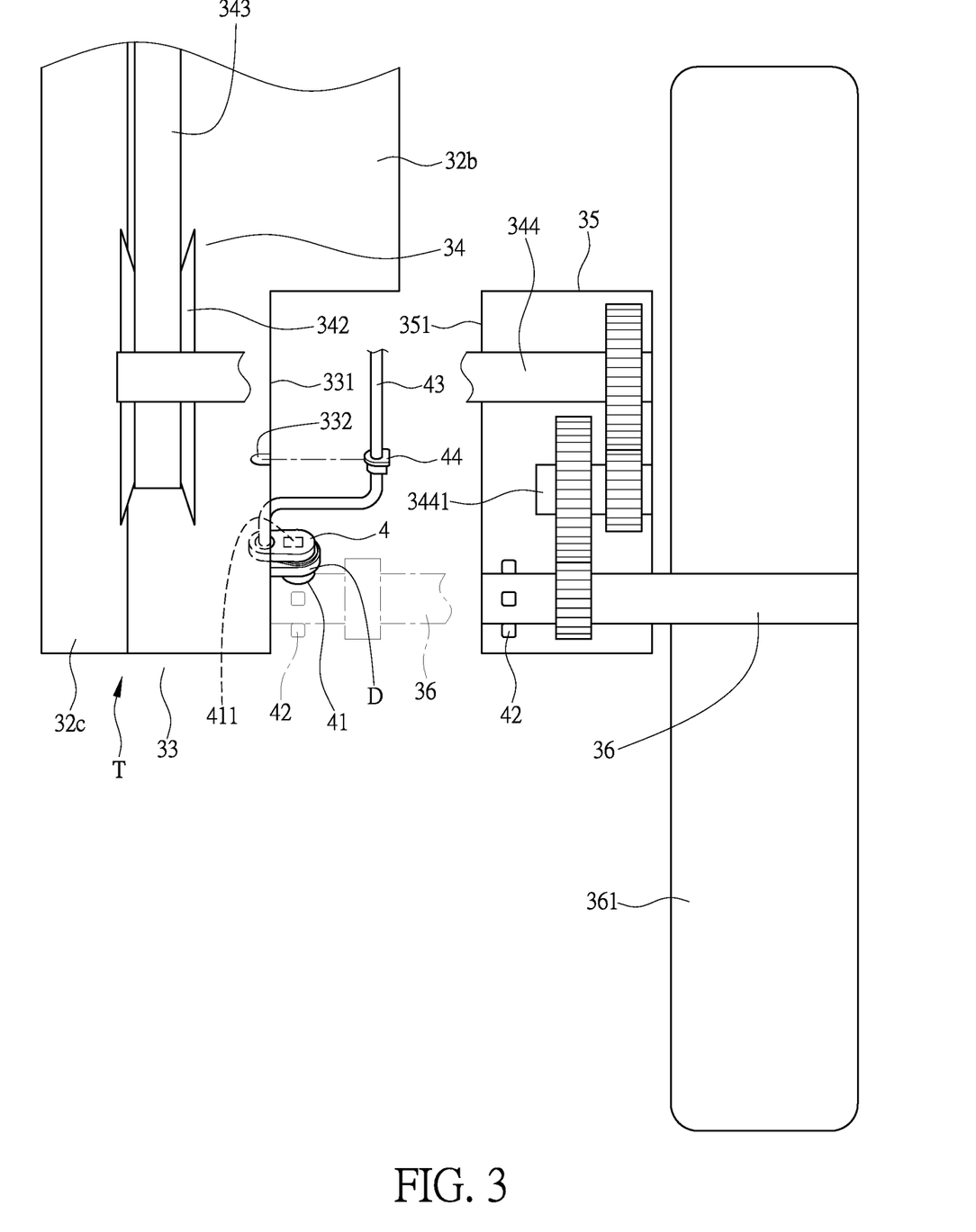
FIG. 3 is a schematic view illustrating an arrangement of a speed sensor according to the present invention.

As shown in FIGS. 2 and 3, the crankcase 32 includes a right crankcase portion 32a and a left crankcase portion 32b (left and right sides being defined in such a way that the side corresponding to the right hand of a rider in a seated condition is the right side and the side corresponding to the left hand is the left side, this definition being equally applicable hereinafter). The crankcase 32 is provided, at an outer side (left side) of the left crankcase portion 32b, with and covered by an outer cover 32c to form the continuously variable transmission box 33. The continuously variable transmission mechanism arranged inside the continuously variable transmission box 33 is a belt continuously variable transmission mechanism 34. In this way, the continuously variable transmission box 33 is structured as a full-coverage box cover, to provide the belt continuously variable transmission mechanism 34 that is located inside the continuously variable transmission box 33, with an effect of concealment. The output shaft 3212 of the crankshaft 321 extends into the continuously variable transmission box 33. The belt continuously variable transmission mechanism 34 includes a driving wheel 341 that is drivable by the output shaft 3212 of the crankshaft 321, a driven wheel 342 that is drivable by the driving wheel 341, and a driving belt 343 that is connected between the driving wheel 341 and the driven wheel 342. The driving wheel 341, after being driven by the output shaft 3212 of the crankshaft 321, drives, by means of the driving belt 343, the driven wheel 342 to perform rotation of variable transmission. The driven wheel 342 is provided, at a center thereof, with a driving shaft 344. The driving shaft 344 extends into the gear box 35 to drive a driving sub-shaft 3441, and the driving sub-shaft 3441 drives the output shaft 36 inside the gear box 35, so as to drive the rear wheel 361 to rotate.

As shown in FIGS. 2 and 3, a concealed "dry" (namely lubricant-free) sensing space B is formed between the continuously variable transmission box 33 and the gear box 35 of the transmission system T. A speed sensor 4 is mounted in the sensing space B. The speed sensor 4 includes a detector element 41 and a detectable element 42 that is detectable by the detector element 41. The detector element 41 is provided with a message transmission portion 411 that is operable to transmit out a detection message. The message transmission portion 411 is connectable to a message transmission line 43 or a wireless radio frequency device (not shown in the drawings) to transmit out the message. In the following description, a message transmission line 43 is taken as an example for illustration. The detector element 41 can be an optic detector element or a magnet detector element. In case of being an optic detector element, the detector element 41 can be an infrared detector element or a laser detector element. The detectable element 42, as being a counterpart to and corresponding to the detector element 41, can be an optic reflecting piece or a magnetic object, or can alternatively be formed of at least one projection block or recessed trough, or a toothed structure, formed on or in the output shaft 36 or the driving shaft 344 or the driving sub-shaft 3441. Specifically speaking, the detectable element 42 is mounted on a detection shaft (which can be for example the output shaft 36 or the driving shaft 344 or the driving sub-shaft 3441), and the detection shaft (such as the output shaft 36 or the driving shaft 344 or the driving sub-shaft 3441) can be any one extending from the above-discussed gear box 35 into the sensing space B and comprising a rotating axle of the detectable element 42 (which can be for example the output shaft 36 or the driving shaft 344 or the driving sub-shaft 3441), and the detection shaft (such as the output shaft 36 or the driving shaft 344 or the driving sub-shaft 3441) is sleeved with a leakage-preventing member (such as an oil seal) that is arranged to provide isolation between the sensing space B and the gear box 35. The detector element 41 is mounted on a sensor mounting seat D. The sensing space B is arranged close to the gear box 35. Since the detectable element 42 is disposed on the output shaft 36, the detector element 41 is located above the output shaft 36. The message transmission line 43 extends from the detector element 41 and is connected to ae displaying device (such as an instrument device that is not shown in the drawings) to have a speed message sensed or detected by the detector element 41 displayed on the displaying device. The message transmission line 43 is provided with a sealing member 44, and the sealing member 44 is made of an elastic material, such as rubber or plastics.

As shown in FIGS. 2 and 3, the continuously variable transmission box 33 has a right side (namely the left crankcase portion 32b) is extended to form a wall surface 331 for the purpose of coupling or combining, and the gear box 35 has a left side that faces toward the left crankcase portion 32b and is similarly formed a wall surface 351 for coupling or combining. The wall surface 331 of the continuously variable transmission box 33 and the wall surface 351 of the gear box 35 form the sensing space B. The wall surface 331 on the right side of the continuously variable transmission box 33 is recessed to form a mounting recess 332. The mounting recess 332 is arranged to receive the sealing member 44 to fit therein, so that when the gear box 35 is combined or joined, by means of the wall surface 351, to the wall surface 331 of the continuously variable transmission box 33, the wall surface 351 of the gear box 35 presses down the sealing member 44 that is fit in the mounting recess 332 to ensure an effect of preventing leakage provided by the sealing member 44, while not interfering with joining or combination of the gear box 35 to the wall surface 331 of the continuously variable transmission box 33 by means of the wall surface 351. In other words, the sensor mounting seat D is mounted to the wall surface 331 of the continuously variable transmission box 33 or the wall surface 351 of the gear box 35, and the sealing member 44 provided on the message transmission line 43 of the speed sensor 4 is mounted on the wall surface 331 of the continuously variable transmission box 33 or the wall surface 351 of the gear box 35, or between the wall surface 331 of the continuously variable transmission box 33 and the wall surface 351 of the gear box 35.

Figure 4:
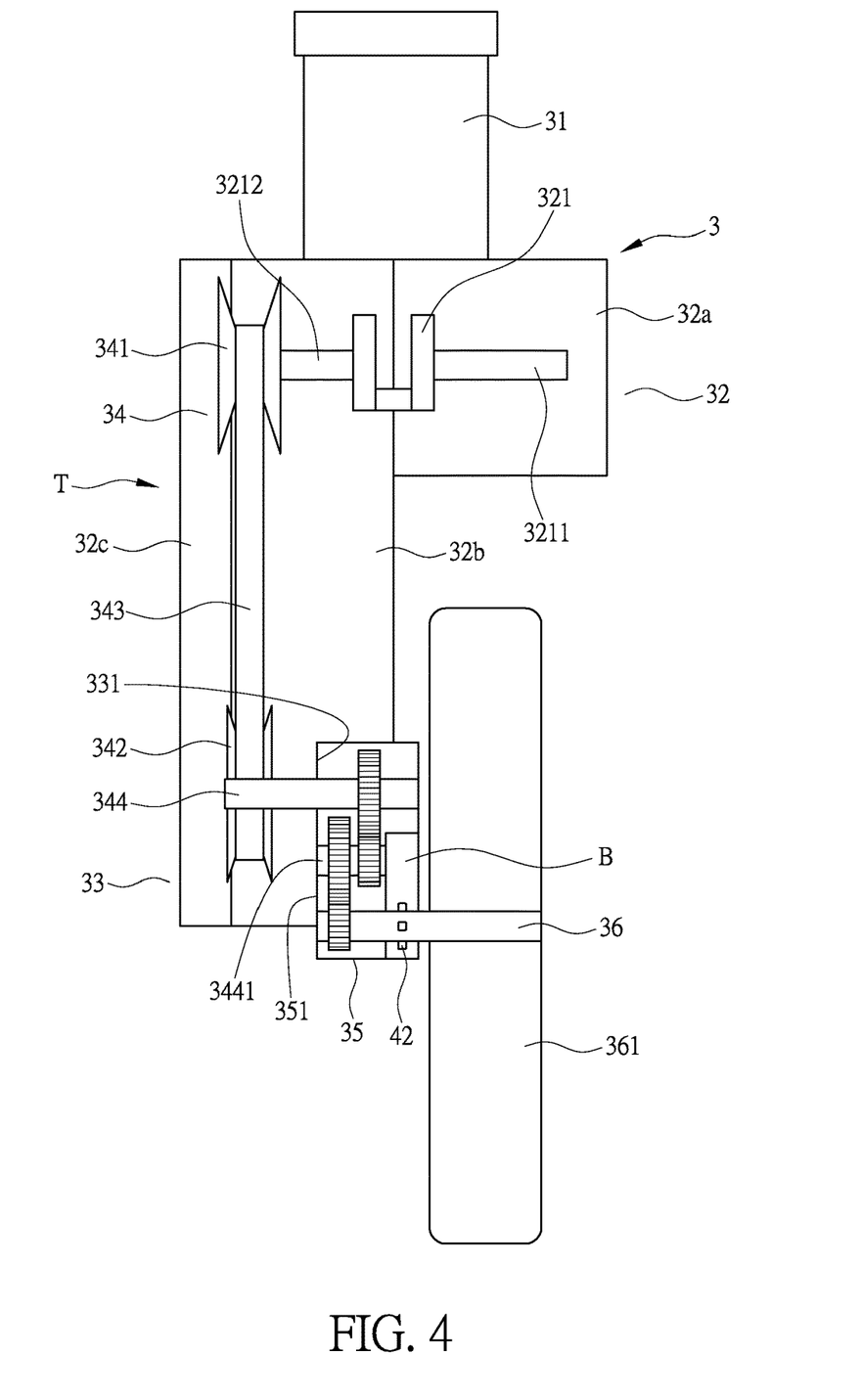
FIG. 4 is a second embodiment illustrating an arrangement of a speed sensor according to the present invention.

As shown in FIG. 4, in a second embodiment of the present invention, the sensing space B is formed on the right side of the gear box 35, and the sensor mounting seat D (meaning the speed sensor 4) is mounted on the gear box 35, and the detectable element 42 of the speed sensor 4 is mounted on the output shaft 36.

Figure 5:
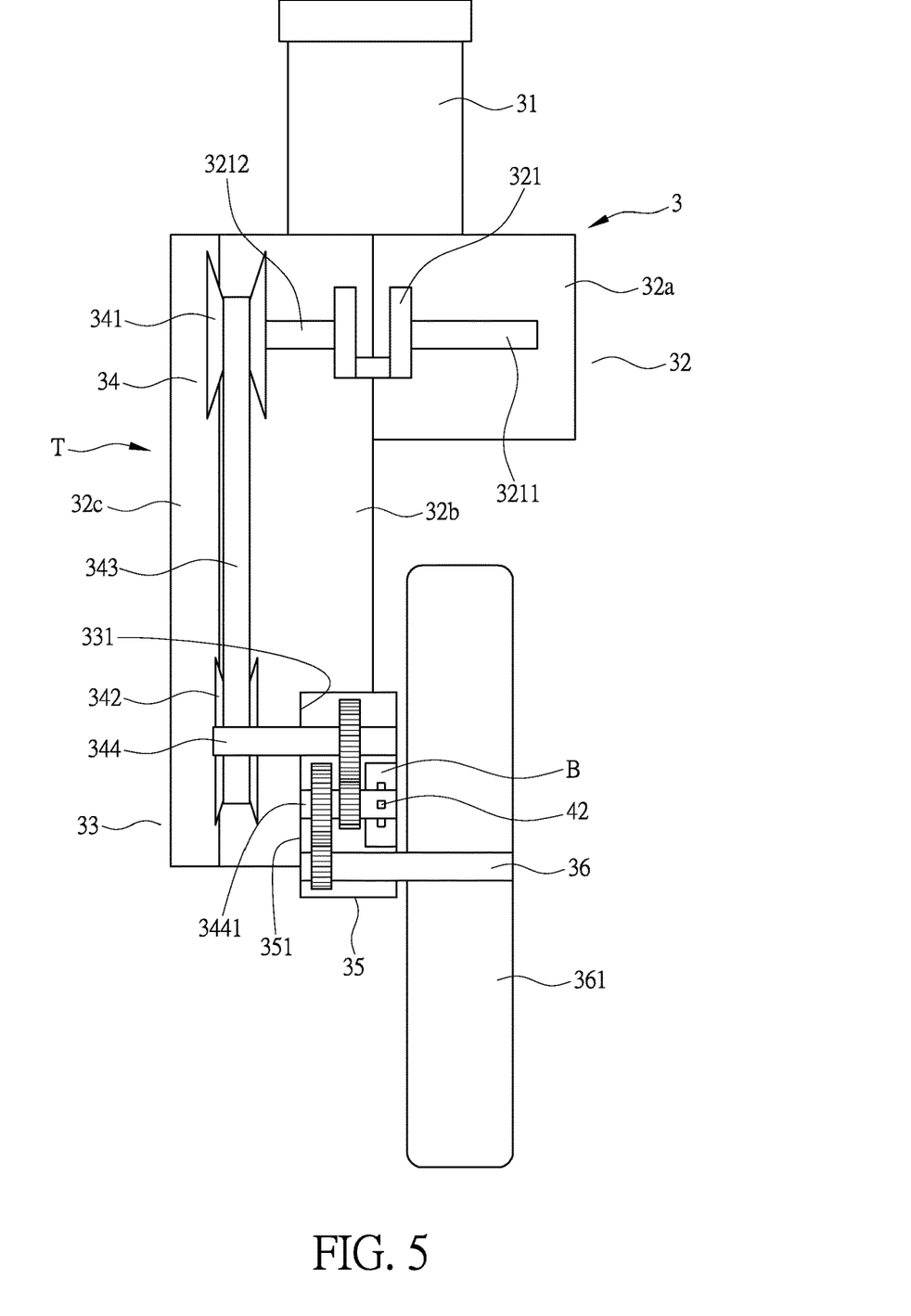
FIG. 5 is a third embodiment illustrating an arrangement of a speed sensor according to the present invention.

As shown in FIG. 5, in a third embodiment of the present invention, the sensing space B is formed in the gear box 35, and the sensor mounting seat D (meaning the speed sensor 4) is mounted on the gear box 35, and the detectable element 42 of the speed sensor 4 is mounted on the driving sub-shaft 3441.

Figure 6:
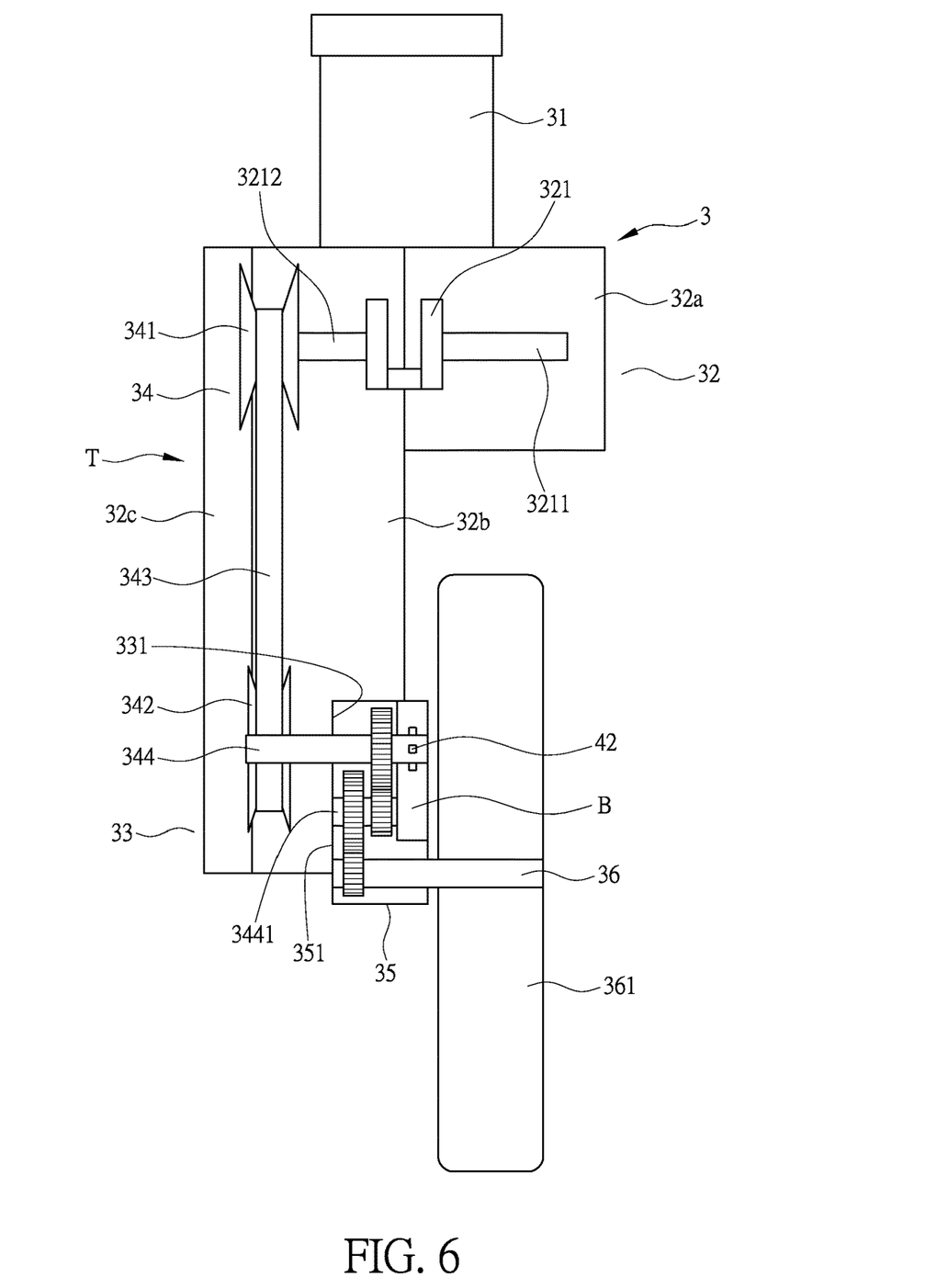
FIG. 6 is a fourth embodiment illustrating an arrangement of a speed sensor according to the present invention.

As shown in FIG. 6, in a fourth embodiment of the present invention, the sensing space B is formed on the right side of the gear box 35, and the sensor mounting seat D (meaning the speed sensor 4) is mounted on the gear box 35, and the detectable element 42 of the speed sensor 4 is mounted on the driving shaft 344.

Figure 7:
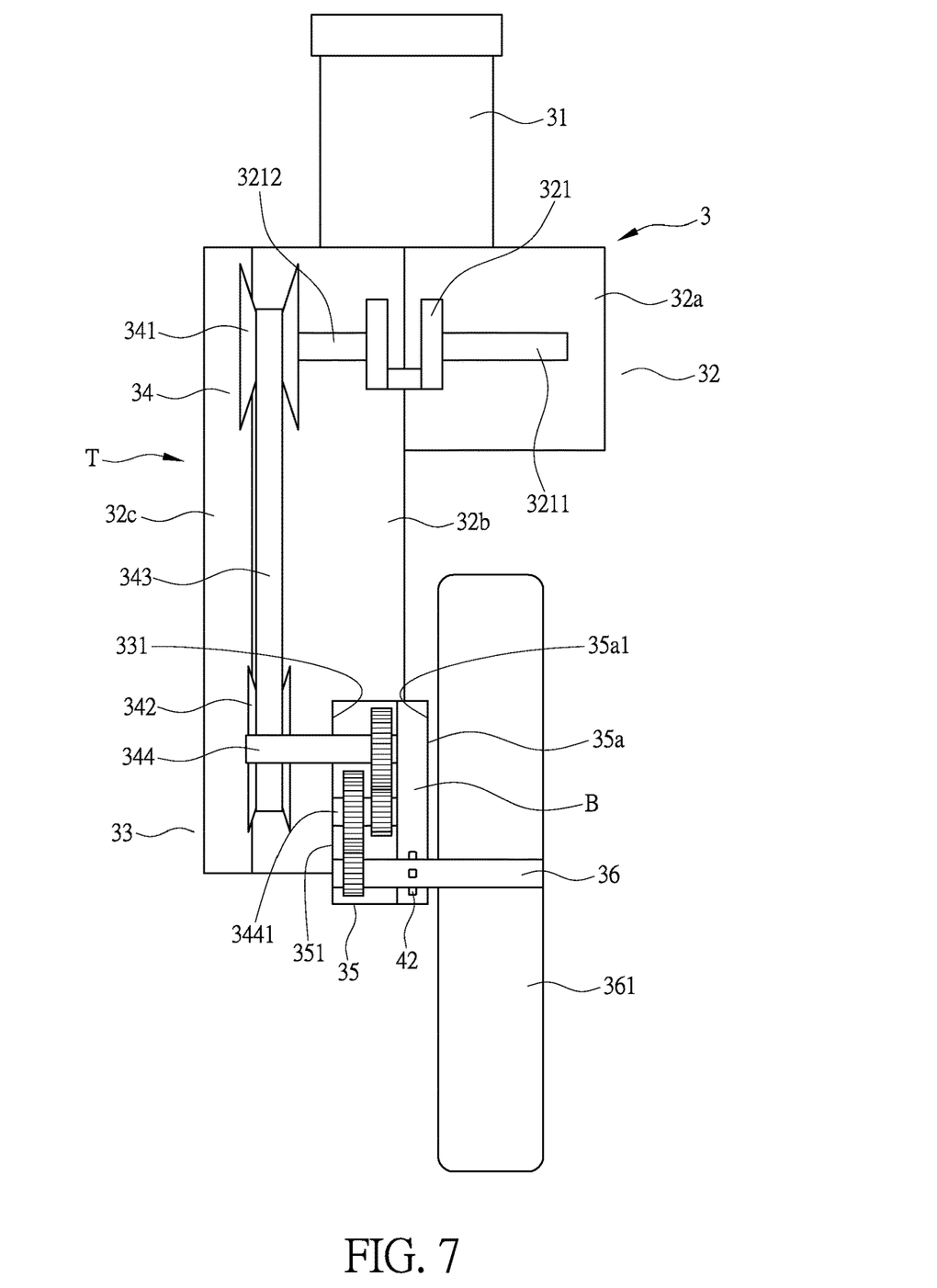
FIG. 7 is a fifth embodiment illustrating an arrangement of a speed sensor according to the present invention.

As shown in FIG. 7, in a fifth embodiment of the present invention, the right side of the gear box 35 (which faces toward the rear wheel 361) is provided with and covered by a covering member 35a to form the sensing space B, and the sensor mounting seat D (meaning the speed sensor 4) is mounted on the wall surface 351 of the gear box 35 or a wall surface 35a1 of the covering member 35a, and the sealing member 44 provided on the message transmission line 43 of the detector element 41 is mounted between the wall surface 351 of the gear box 35 and the wall surface 35a1 of the covering member 35a, or is mounted to the covering member 35a, and the detectable element 42 of the speed sensor 4 is mounted on the output shaft 36, so that the speed sensor 4 is removable, together with the covering member 35a, from the gear box 35.

Figure 8:
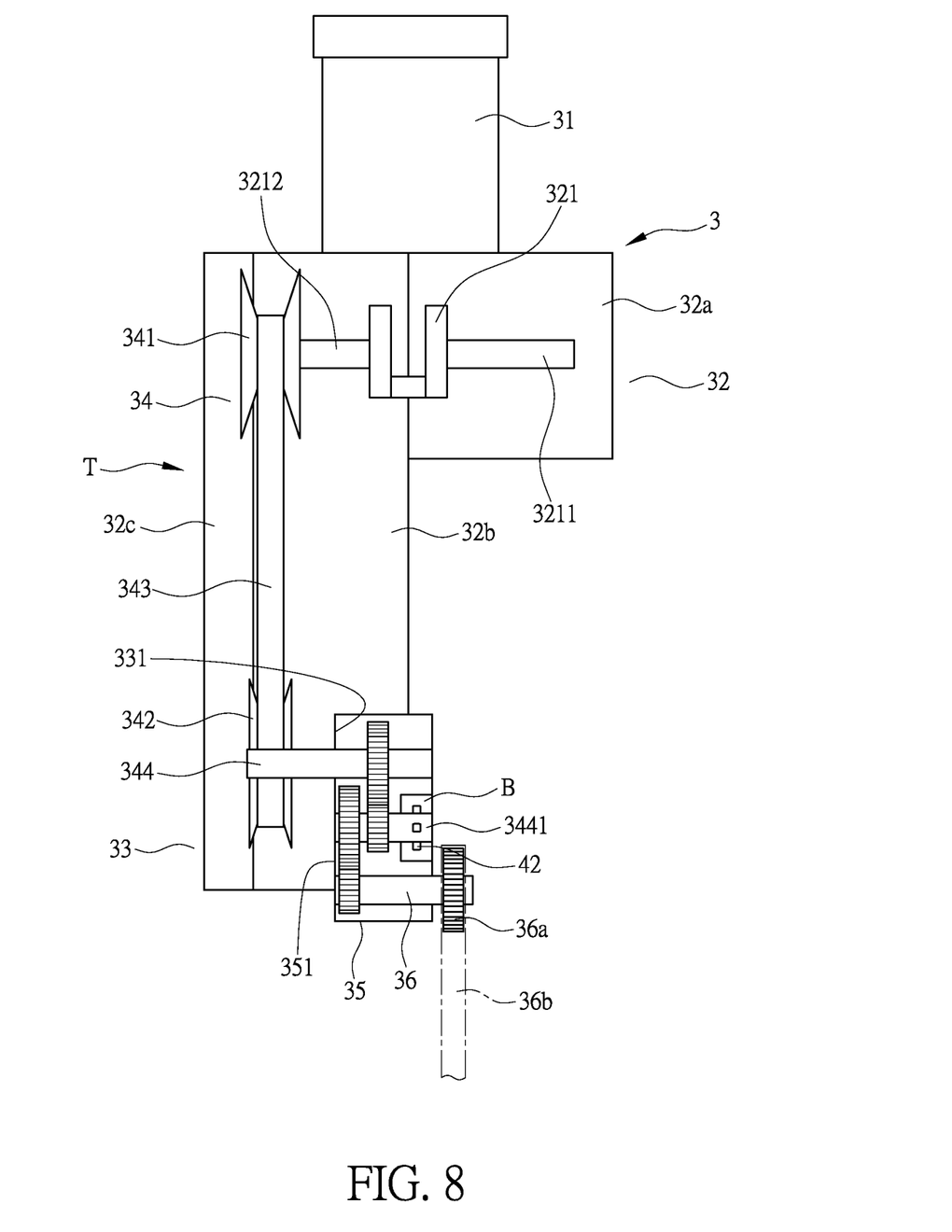
FIG. 8 is a sixth embodiment illustrating an arrangement of a speed sensor according to the present invention.

As shown in FIG. 8, in a sixth embodiment of the present invention, the output shaft 36 extends out of the gear box 35 and is provided with a driving gear 36a mounted thereto, and the driving gear 36a is operable with a band-like driving member 36b (such as a chain or a belt) to drive the rear wheel 361 or a rear wheel axle (not shown in the drawings), and the gear box 35 may be further provided, in an interior thereof, with a "wet" reduction gear mechanism or a "wet" gear mechanism of a gear-position shifting hub (not shown in the drawings), and the sensing space B is formed in the gear box 35, and the sensor mounting seat D (meaning the speed sensor 4) is mounted on the gear box 35, and the detectable element 42 of the speed sensor 4 is mounted on the driving sub-shaft 3441.

Figure 9:
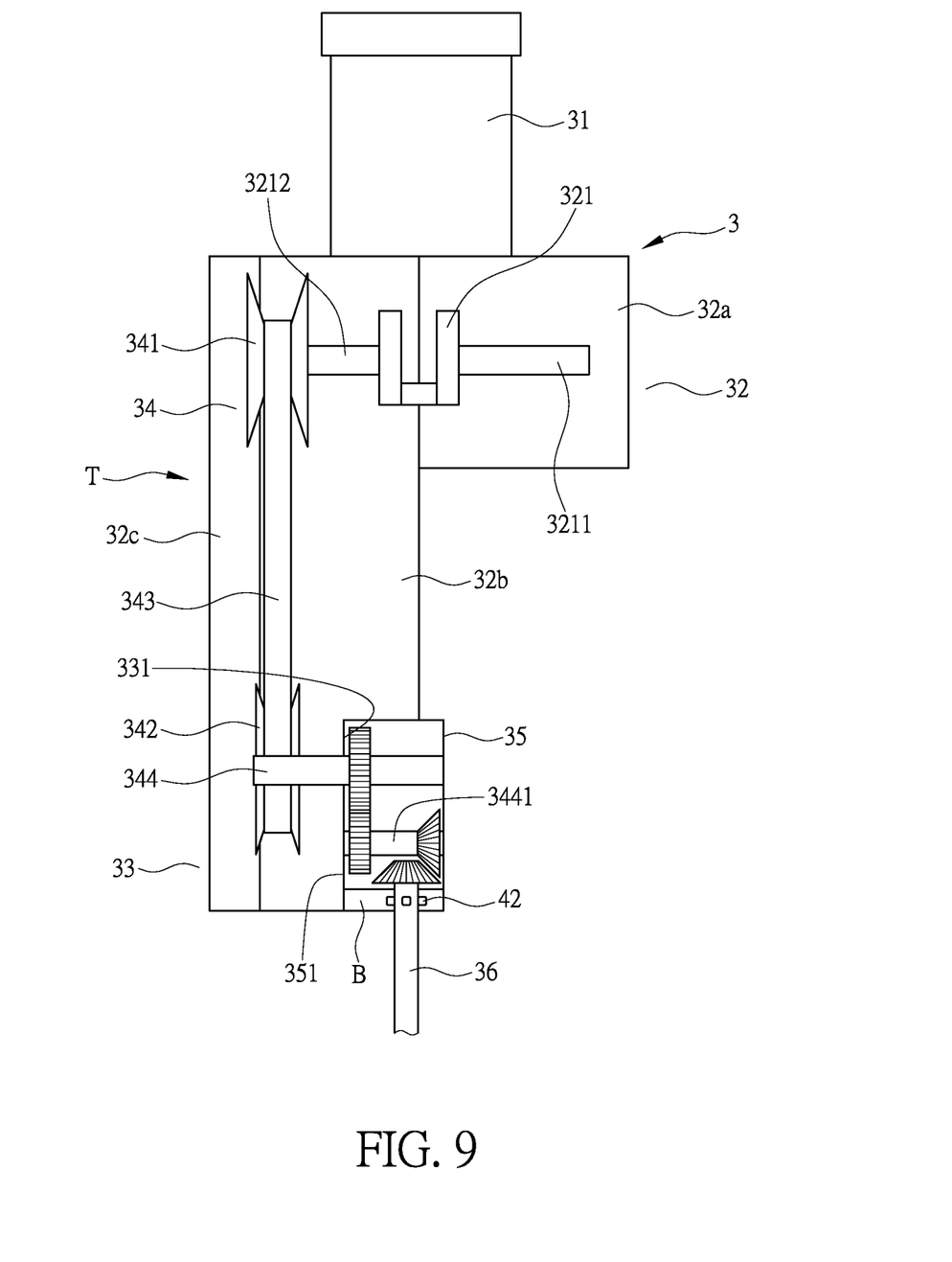
FIG. 9 is a seventh embodiment illustrating an arrangement of a speed sensor according to the present invention.

As shown in FIG. 9, in a seventh embodiment of the present invention, the output shaft 36 is set in engagement with the driving sub-shaft 3441 by means of segmental gears inside the gear box 35, and the output shaft 36 (such as a chain or a belt) to drive the rear wheel 361 or the rear wheel axle (not shown in the drawings), and the gear box 35 may be further provided, in an interior thereof, with a "wet" reduction gear mechanism or a "wet" gear mechanism of a gear-position shifting hub (not shown in the drawings), and the sensing space B is formed in the gear box 35, and the sensor mounting seat D (meaning the speed sensor 4) is mounted on the gear box 35, and the detectable element 42 of the speed sensor 4 is mounted on the output shaft 36.

Figure 10:
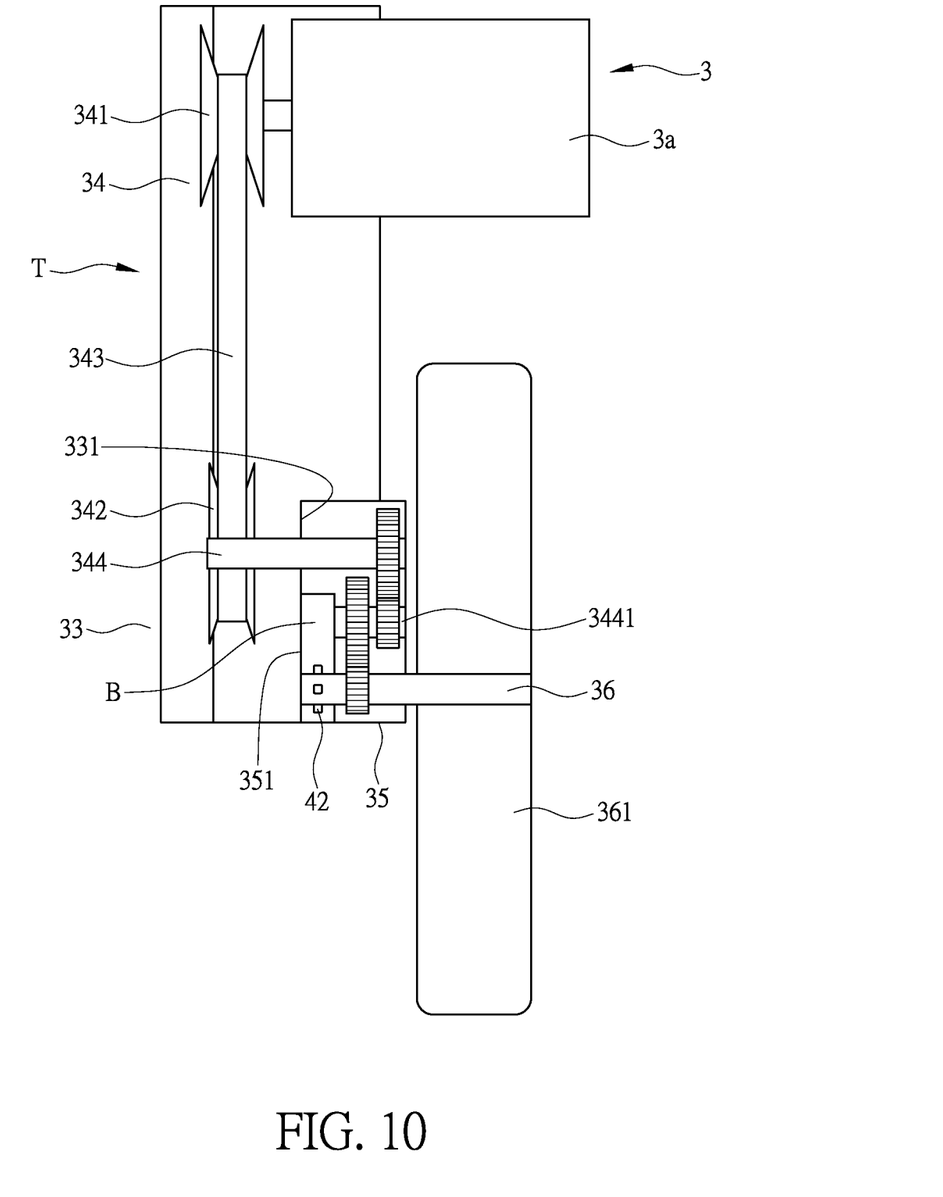
FIG. 10 is an eighth embodiment illustrating an arrangement of a speed sensor according to the present invention.

As shown in FIG. 10, in an eighth embodiment of the present invention, the power unit 3 has a power source that is embodied as an electrically-driven motor 3a, and the electrically-driven motor 3a supplies power to drive the belt continuously variable transmission mechanism 34 in the continuously variable transmission box 33, and the sensing space B is formed between the continuously variable transmission box 33 and the gear box 35, and the sensor mounting seat D (meaning the speed sensor 4) is arranged between the continuously variable transmission box 33 and the gear box 35, and the detectable element 42 of the speed sensor 4 is mounted on the output shaft 36.

The primary efficacy of the present invention is that a vehicle 2 includes a power unit 3, and the power unit 3 is connected with a transmission system T, and the transmission system T is provided with a sensing space B, and the sensing space B is provided therein with a speed sensor 4, and as such, the speed sensor 4 is disposed in a space that is completely concealed to prevent the speed sensor 4 from being hit by external sand and stones or corroded by external dust or moisture.

The second efficacy of the present invention is that the speed sensor 4 includes a detector element 41 and a detectable element 42 that is detectable by the detector element 41, and the detector element 41 is provided with a message transmission portion 411 for transmitting out a message, and the message transmission portion 411 is connectable to a message transmission line 43 or is connected with a wireless radio frequency device, and as such, an effect of detection of the speed sensor 4 is ensured.

The third efficacy of the present invention is that the sensing space B is arranged between a continuously variable transmission box 33 and a gear box 35 of a transmission system T, and as such, the speed sensor 4 is disposed in a space that is completely concealed to prevent the speed sensor 4 from being hit by external sand and stones or corroded by external dust or moisture.

The fourth efficacy of the present invention is that the sensing space B is arranged at one side of the gear box 35 of the transmission system T, and as such, the speed sensor 4 is disposed in a space that is completely concealed to prevent the speed sensor 4 from being hit by external sand and stones or corroded by external dust or moisture.

The fifth efficacy of the present invention is that the sensing space B is formed by a wall surface 331 of the continuously variable transmission box 33 and a wall surface 351 of the gear box 35, and as such, the speed sensor 4 is disposed in a space that is completely concealed to prevent the speed sensor 4 from being hit by external sand and stones or corroded by external dust or moisture.

The sixth efficacy of the present invention is that the sensing space B is formed by a wall surface 351 of the gear box 35 and a covering member 35a, and as such, the speed sensor 4 is disposed in a space that is completely concealed to prevent the speed sensor 4 from being hit by external sand and stones or corroded by external dust or moisture.

The seventh efficacy of the present invention is that the above-mentioned detector element 41 is mounted on a sensor mounting seat D, and the sensor mounting seat D is mounted on the wall surface 331 of the continuously variable transmission box 33 or the wall surface 351 of the gear box 35; and the detector element 41 is provided with a message transmission line 43, and the message transmission line 43 is provided with a sealing member 44 mounted thereto; and the sealing member 44 is arranged on the wall surface 331 of the continuously variable transmission box 33 or the wall surface 351 of the gear box 35, or between the wall surface 331 of the continuously variable transmission box 33 and the wall surface 351 of the gear box 35, and as such, the concealment of the speed sensor 4 is ensured.

The eighth efficacy of the present invention is that the above-mentioned detector element 41 is mounted on a sensor mounting seat D, and the sensor mounting seat D is mounted on a wall surface 351 of the gear box 35 or a wall surface 351 of the covering member 35a; and the detector element 41 is provided with a message transmission line 43, and the message transmission line 43 is provided with a sealing member 44 mounted thereto; and the sealing member 44 is arranged between the wall surface 351 of the gear box 35 and the wall surface 35a1 of a covering member 35a, or arranged on the covering member 35a, and as such, the concealment of the speed sensor 4 is ensured.

The ninth efficacy of the present invention is that the detectable element 42 is mounted on a detection shaft, and the detection shaft extends from any one of the above-mentioned gear box 35 into the sensing space B and comprises a rotating axle of the detectable element 42, the detection shaft being sleeved with a leakage-preventing member that provides isolation between the sensing space B and the gear box 35, and as such, the concealment and effect of detection of the speed sensor 4 are ensured.

The tenth efficacy of the present invention is that the sensing space B is a dry space, and as such, the concealment and effect of detection of the speed sensor 4 are ensured.

The eleventh efficacy of the present invention is that the transmission system T includes a continuously variable transmission box 33 and a gear box 35, and the continuously variable transmission box 33 includes a belt continuously variable transmission mechanism 34, and the gear box 35 is provide with a wet reduction gear mechanism or a wet gear mechanism of a gear-position shifting hub; and the power unit 3 is an internal combustion engine or an electrically-driven motor 3a, and as such, universality of utilization of the speed sensor 4 is enhanced.

I claim:

1. A structure of a speed sensor arrangement of a vehicle, the vehicle comprising a power unit, the power unit being connected with a transmission system, wherein the transmission system is provided with a sensing space, and the sensing space provided therein with a speed sensor;

wherein the transmission system comprises a continuously variable transmission box and a gear box, and the continuously variable transmission box comprises a belt continuously variable transmission mechanism; and the gear box is provide with a wet reduction gear mechanism or a wet gear mechanism of a gear-position shifting hub; and the power unit is an internal combustion engine or an electrically-driven motor.

2. The structure of the speed sensor arrangement of the vehicle according to claim 1, wherein the speed sensor comprises a detector element and a detectable element that is detectable by the detector element; and the detector element is provided with a message transmission portion for transmitting a message, and the message transmission portion is connectable to a message transmission line or is connected to with a wireless radio frequency device.

3. The structure of the speed sensor arrangement of the vehicle according to claim 2, wherein the detectable element is mounted to a detection shaft, and the detection shaft is extended from the gear box into the sensing space and comprises a rotating axle of the detectable element, and the detection shaft is sleeved with a leakage-preventing member that provides isolation between the sensing space and the gear box.

4. The structure of the speed sensor arrangement of the vehicle according to claim 2, wherein the sensing space is arranged between a continuously variable transmission box and a gear box of the transmission system.

5. The structure of the speed sensor arrangement of the vehicle according to claim 4, wherein the sensing space is formed by a wall surface of the continuously variable transmission box and a wall surface of the gear box.

6. The structure of the speed sensor arrangement of the vehicle according to claim 5, wherein the detector element is mounted on a sensor mounting seat, and the sensor mounting seat is mounted on the wall surface of the continuously variable transmission box or the wall surface of the gear box; and the detector element is provided with a message transmission line, and the message transmission line is provided with a sealing member mounted thereto; and the sealing member is arranged on the wall surface of the continuously variable transmission box or the wall surface of the gear box, or between the wall surface of the continuously variable transmission box and the wall surface of the gear box.

7. The structure of the speed sensor arrangement of the vehicle according to claim 2, wherein the sensing space is arranged at one side of a gear box of the transmission system.

8. The structure of the speed sensor arrangement of the vehicle according to claim 7, wherein the sensing space is formed by a wall surface of the gear box and a covering member.

9. The structure of the speed sensor arrangement of the vehicle according to claim 8, wherein the detector element is mounted on a sensor mounting seat, and the sensor mounting seat is mounted on the wall surface of the gear box or a wall surface of the covering member; and the detector element is provided with a message transmission line, and the message transmission line is provided with a sealing member mounted thereto; and the sealing member is arranged between the wall surface of the gear box and the wall surface of the covering member, or on the covering member.

10. The structure of the speed sensor arrangement of the vehicle according to claim 1, wherein the sensing space is arranged between a continuously variable transmission box and a gear box of the transmission system.

11. The structure of the speed sensor arrangement of the vehicle according to claim 10, wherein the sensing space is formed by a wall surface of the continuously variable transmission box and a wall surface of the gear box.

12. The structure of the speed sensor arrangement of the vehicle according to claim 11, wherein the detector element is mounted on a sensor mounting seat, and the sensor mounting seat is mounted on the wall surface of the continuously variable transmission box or the wall surface of the gear box; and the detector element is provided with a message transmission line, and the message transmission line is provided with a sealing member mounted thereto; and the sealing member is arranged on the wall surface of the continuously variable transmission box or the wall surface of the gear box, or between the wall surface of the continuously variable transmission box and the wall surface of the gear box.

13. The structure of the speed sensor arrangement of the vehicle according to claim 1, wherein the sensing space is arranged at one side of a gear box of the transmission system.

14. The structure of the speed sensor arrangement of the vehicle according to claim 13, wherein the sensing space is formed by a wall surface of the gear box and a covering member.

15. The structure of the speed sensor arrangement of the vehicle according to claim 14, wherein the detector element is mounted on a sensor mounting seat, and the sensor mounting seat is mounted on the wall surface of the gear box or a wall surface of the covering member; and the detector element is provided with a message transmission line, and the message transmission line is provided with a sealing member mounted thereto; and the sealing member is arranged between the wall surface of the gear box and the wall surface of the covering member, or on the covering member.

16. The structure of the speed sensor arrangement of the vehicle according to claim 1, wherein the sensing space is a dry space.

\* \* \* \* \*